United States Patent
Clark et al.

(10) Patent No.: US 9,813,234 B2
(45) Date of Patent: Nov. 7, 2017

(54) TRANSFERABLE MULTIPARTY COMPUTATION

(71) Applicant: The United States of America, as represented by the Secretary of the Air Force, Washington, DC (US)

(72) Inventors: Michael R Clark, Beavercreek, OH (US); Kenneth M Hopkinson, Huber Heights, OH (US)

(73) Assignee: The United States of America, as represented by the Secretery of the Air Force, Washington, DC (US)

( * ) Notice: Subject to any disclaimer, the term of this patent is extended or adjusted under 35 U.S.C. 154(b) by 78 days.

(21) Appl. No.: 14/708,532

(22) Filed: May 11, 2015

(65) Prior Publication Data

US 2016/0335440 A1   Nov. 17, 2016

(51) Int. Cl.
  *G06F 21/60* (2013.01)
  *H04L 9/00* (2006.01)
  *H04L 9/08* (2006.01)

(52) U.S. Cl.
  CPC ............ *H04L 9/008* (2013.01); *G06F 21/602* (2013.01); *H04L 9/085* (2013.01)

(58) Field of Classification Search
  CPC ....... G06F 21/60; G06F 21/602; H04L 9/085; H04L 2209/46; H04L 9/008
  USPC ............................................ 726/26; 380/255
  See application file for complete search history.

(56) References Cited

U.S. PATENT DOCUMENTS

| | | | |
|---|---|---|---|
| 6,834,272 B1 | 12/2004 | Naor et al. | |
| 7,181,017 B1 * | 2/2007 | Nagel | H04L 9/0825 380/282 |
| 7,240,198 B1 * | 7/2007 | Pinkas | H04L 9/321 713/168 |
| 7,386,131 B2 * | 6/2008 | Jing | H04L 9/0827 380/278 |
| 7,421,080 B2 * | 9/2008 | Matsumura | H04L 9/085 380/277 |
| 8,515,058 B1 * | 8/2013 | Gentry | H04L 9/008 380/28 |

(Continued)

OTHER PUBLICATIONS

Ak,amo, Sameer, "A Trusted Execution Platform for Multiparty Computation", Master of Science at MIT, Sep. 2000.*

(Continued)

*Primary Examiner* — Kambiz Zand
*Assistant Examiner* — Tongoc Tran
(74) *Attorney, Agent, or Firm* — AFMCLO/JAZ; Charles Figer, Jr.

(57) ABSTRACT

A method and apparatus are provided for secure multiparty computation. A set of first parties is selected from a plurality of first parties for computation. Inputs for computation associated with each party in the set of first parties are divided into shares to be sent to other parties in the set of first parties. The computation on the shares is performed by the set of first parties using multiparty computation functions. In response to a trigger event, shares of the set of first parties are transferred to a set of second parties selected from a plurality of second parties. The computation is completed by the set of second parties using the transferred shares. Finally, the transferred shares are recombined to reveal an output of the computation.

11 Claims, 11 Drawing Sheets

(56) References Cited

U.S. PATENT DOCUMENTS

| | | | | |
|---|---|---|---|---|
| 8,756,410 | B2* | 6/2014 | Raykova | H04L 9/008 380/28 |
| 8,943,354 | B2* | 1/2015 | Canini | G06F 11/008 714/4.1 |
| 9,450,938 | B1* | 9/2016 | Lampkins | H04L 63/08 |
| 2010/0037055 | A1* | 2/2010 | Fazio | H04L 9/3218 713/171 |
| 2011/0110525 | A1* | 5/2011 | Gentry | H04L 9/0822 380/285 |
| 2011/0211692 | A1* | 9/2011 | Raykova | H04L 9/008 380/46 |
| 2012/0002811 | A1 | 1/2012 | Smart | |
| 2012/0070000 | A1* | 3/2012 | Baechler | H04L 9/3218 380/255 |
| 2012/0213359 | A1* | 8/2012 | Troncoso Pastoriza | H04L 9/008 380/28 |
| 2012/0233460 | A1 | 9/2012 | Kamara et al. | |
| 2013/0170640 | A1* | 7/2013 | Gentry | H04L 9/28 380/30 |
| 2013/0191632 | A1* | 7/2013 | Spector | H04L 9/083 713/155 |
| 2015/0213079 | A1* | 7/2015 | Shukla | G06F 17/30371 707/687 |

OTHER PUBLICATIONS

Canetti et al., "Adaptive Secure Multi-party Computation", TR 682 (LCS/MIT), Feb. 1996.*

Ben-Or, Michael et al., "Completeness theorems for non-cryptographic fault-tolerant distributed computation (extended abstract)," Proceedings of the Twentieth Annual ACM Symposium on Theory of Computing, STOC '88, pp. 1-10, ACM, 1988.

Damgard, I. et al., "Multiparty computation from somewhat homomorphic encryption," Cryptology ePrint Archive, Report 2011/535, 2001. http://eprint.iarc.org/.

Danezis, G. et al., "Differentially private billing with rebates," Proceedings of the 13th International Conference on Information Hiding, IH '11, pp. 148-162, 2001.

Paillier, Pascal, "Public-Key Cryptosystems based on Composite Degree Residuosity Classes," Proceedings of the 17th International Conference on Theory and Application of Cryptographic Techniques, EUROCRYPT '99, pp. 223-238, Berlin, Heidelberg, 1999.

Shamir, Adi, "How to Share a Secret," Communications of the ACM, 22(11):612-613, 1979.

McEliece, R.J. et al., "On Sharing Secrets and Reed-Solomon Codes", Communications of the ACM, vol. 24, issue 9, pp. 583-584, 1981. http://www.ifp.illinois.edu/~sarwate/pubs/McEliece81Sharing.pdf.

* cited by examiner

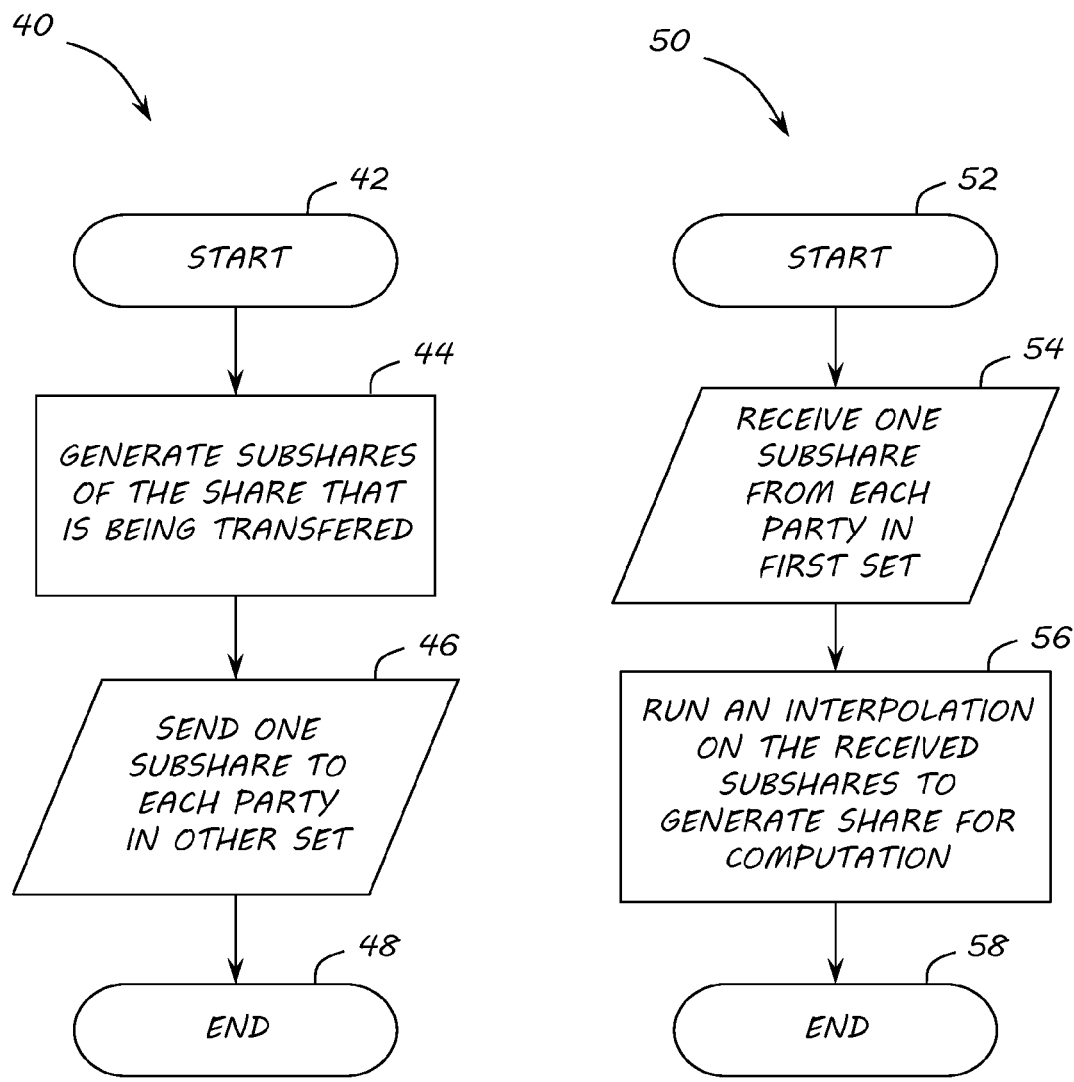

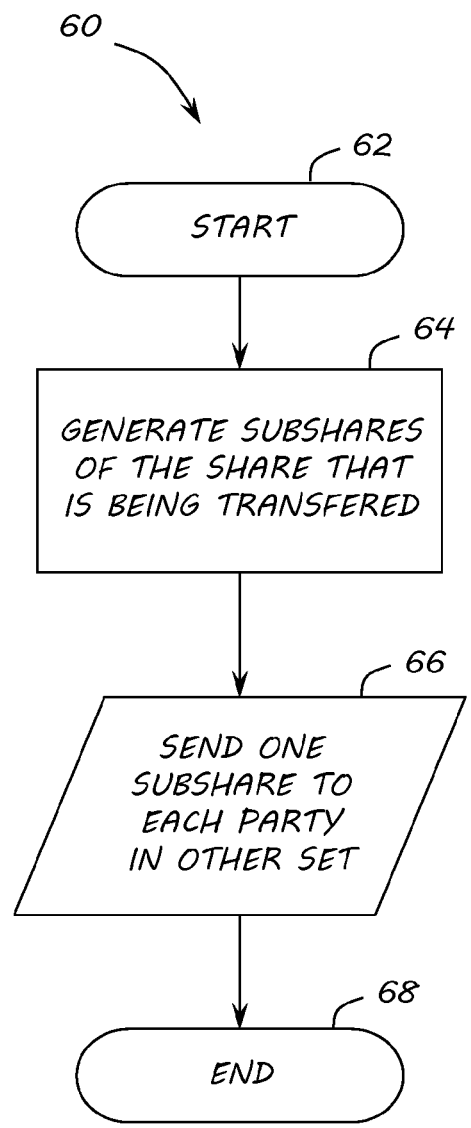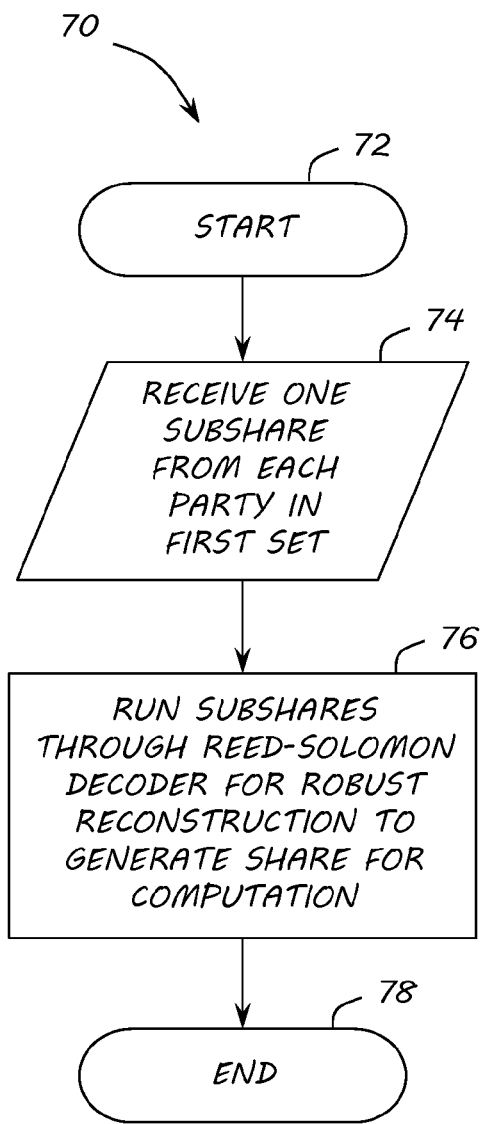
FIG. 5
FIG. 6

|  | SHARE | | RECONSTRUCT | | ADD | MULTIPLY | |
|---|---|---|---|---|---|---|---|
|  | $c_2$ | $c_1$ | $c_2$ | $c_1$ | $c_1$ | $c_2$ | $c_1$ |
| METER | 1.178 | -1.019 | 0.056 | 0.289 | 0.07 | 1.234 | -0.66 |
| SINK | 0.013 | -0.036 | 0.003 | 0.01 | 0.002 | 0.049 | -0.026 |

FIG. 8

|  | PREPROCESSING | | | MULTIPLY | |
|---|---|---|---|---|---|
|  | $c_3$ | $c_2$ | $c_1$ | $c_2$ | $c_1$ |
| METER | 0.141 | 4.879 | -3.209 | 0.112 | 0.58 |
| SINK | 0.002 | 0.181 | -0.114 | 0.006 | 0.02 |

FIG. 9

TRANSFERABLE MULTIPARTY COMPUTATION

RIGHTS OF THE GOVERNMENT

The invention described herein may be manufactured and used by or for the Government of the United States for all governmental purposes without the payment of any royalty.

BACKGROUND OF THE INVENTION

Field of the Invention

The present invention generally relates to methods for performing secure multiparty computations.

Description of the Related Art

Whether in business, government, or the military, information can be exploited to gain a competitive advantage. Each and every day, more and more information is exploited to make systems more efficient, more accurate, and more reliable. Consider two simple examples. A product's reputation, as determined by other consumer's feedback, is an often used measure when one is purchasing products online. This sort of information has become almost ubiquitous in online purchasing. A similar feedback mechanism is also used in a number of distributed systems in a more decentralized fashion. When one node, say $n_q$, needs to interact with another, say $n_t$, $n_q$ can query its neighbors to find out how much they trust $n_t$ and therefore come up with a reputation for $n_t$.

Another example is in the case of a smart grid. A smart grid is a modernized power grid that enables bidirectional flows of energy and utilizes two-way communication and control capabilities that may lead to an array of new functionalities and applications. By definition the smart grid may exploit fine granular data from consumers, suppliers, etc. to greatly enhance the grid. A common scenario in the smart grid may be to have each household meter report their instantaneous usage back to the supplier. This information may then be exploited at a supplier or distributor to better optimize generation, distribution, or to aid in purchasing or selling excess production.

However, this increased gathering and use of information comes with tradeoffs. Often in these cases, it is privacy that is traded in order to achieve the benefits set out above. In the case of reputation, compromised privacy may incentivize untruthfulness when providing feedback in order to avoid retribution, for example. In this case, the compromise of privacy may diminish the utility of the entire system. In the case of the smart grid, the gathered information may leak other, unintended information. This other, unintended information may be used to determine whether or not someone is home, how many people live in a house, what appliances are in use, etc.

Researchers have, for decades, been developing methods to deal with these problems. The most promising technique can broadly be called privacy preserving computation. It stems from the observation that, in many applications, interested parties really need not learn the inputs of the other participants. What interested parties really need is some function of those inputs. In both of the example applications outlined previously, an interested party really only needs to learn statistics on the inputs (e.g., mean or standard deviation). Thus, what is needed in the art is a mechanism that allows for better practice of the principle of least privilege, i.e., that a node should be given access to only the minimal amount of information necessary to do its job.

SUMMARY OF THE INVENTION

A method of secure multiparty computation is presented. A set of first parties is selected from a plurality of first parties for computation. Inputs for computation associated with each party in the set of first parties are divided into shares to be sent to other parties in the set of first parties. The computation is performed on the shares by the set of first parties using multiparty computation functions such as SHARE, ADD, MULT, and RECOMBINE. Shares of the set of first parties are transferred to a set of second parties selected from a plurality of second parties in response to a trigger event. The computation is completed by the set of second parties using the transferred shares. Finally, the transferred shares are recombined to reveal an output of the computation to an authorized party.

In some embodiments, transferring shares includes generating subshares of a share that is being transferred and sending one subshare of the generated subshares to each party in the set of second parties. A Lagrangian interpolation is performed on subshares received by each of the parties in the second set of parties to generate a share for computation. In other embodiments, transferring shares includes generating subshares of a share that is being transferred and sending one subshare of the generated subshares to each party in the set of second parties. A Reed-Solomon decoder for robust reconstruction is performed on subshares received by each of the parties in the second set of parties to generate a share for computation. In any of the embodiments, the first and second parties may overlap.

A system is also provided including a first node. The first node has a processor, a memory, a network interface, and program code. The first program code of the first node is configured to perform secure multiparty computation by receiving shares for computation via the network interface and performing the computation on the received shares using multiparty computation functions. The program code of the first node is further configured to transfer a share of the received shares by generating subshares of a share that is being transferred and sending at least one subshare of the generated subshares to a second node in response to a triggering event.

The system further includes a second node also having a processor, a memory, a network interface, and program code. In some embodiments, the program code of the second node is configured to receive transferred subshares for computation via the network interface, perform a Lagrangian interpolation on the received transferred subshares to generate a share for computation, and perform the computation on interpolated shares using multiparty computation functions. In other embodiments, the program code of the second node is configured to receive transferred subshares for computation via the network interface, perform a Reed-Solomon decoder for robust reconstruction on the received transferred subshares to generate a share for computation, and perform the computation on decoded shares using multiparty computation functions.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 3 is a flow diagram of a TRANSFER function in an Honest but Curious environment consistent with embodiments of the invention;

FIG. 4 is a flow diagram of a RECOMBINE_TRANSFER function in the Honest but Curious environment consistent with embodiments of the invention;

FIG. 5 is a flow diagram of the TRANSFER function in a malicious environment consistent with embodiments of the invention;

FIG. 6 is a flow diagram of the RECOMBINE_TRANSFER function in the malicious environment consistent with embodiments of the invention;

FIG. 8 contains a table of coefficients for timing estimation polynomial of basic operations;

FIG. 9 contains a table of coefficients for timing estimation polynomial of malicious model operations;

Figure 1A:
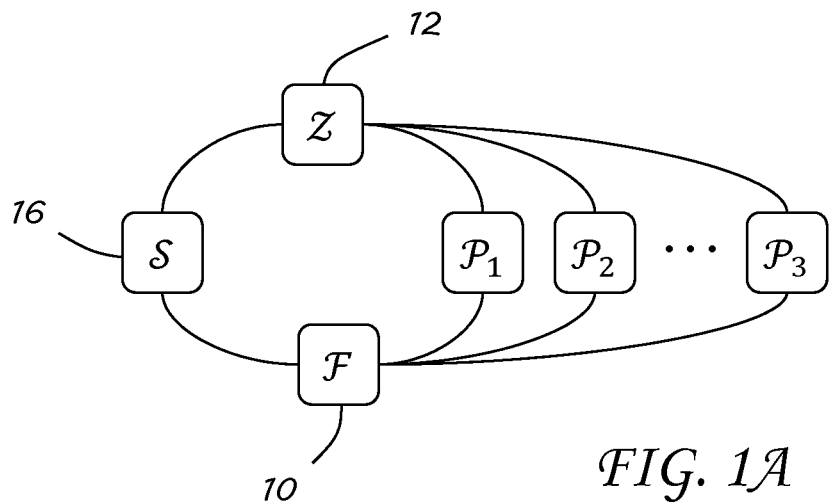
FIG. 1A is a diagram representing an ideal world in a universally composable security framework setup.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Privacy is a growing concern in the digital world as more information becomes digital every day. Often the implications of how this information could be exploited for nefarious purposes are not explored until after the fact, which is becoming more of a concern with the general public. A good illustration of this concern comes from 2009 Dutch legislation, which rejected the deployment of smart power meters. The rejected deployment was due to privacy concerns related to the fine grained information reporting necessary for the smart grid. Furthermore, simple, common protections such as end to end encryption do not necessarily follow the principle of least privilege access, as often the end nodes do not need to know all the information that is currently being reported. The end nodes likely only need to know the results of computations on the reported information, such as the mean, standard deviation, etc.

Recent breakthroughs in privacy preserving computation techniques show promise as a viable option to protect users' privacy, while still allowing information to be processed and results delivered to authorized parties. Yet, existing protocols are still not sufficient for wide scale deployment in large systems. Embodiments of the invention provide new techniques for privacy preserving computation, which enable more scalable systems in a number of application scenarios. Before proceeding to a description of the embodiments of the invention, some of the basic concepts used in the description will be presented.

When deploying privacy preserving computations, there are two primary contemporary adversary models, the honest-but-curious (HbC) model, which is sometimes referred to as semi-honest, and the malicious model. In the HbC model, adversaries follow a protocol exactly as specified. For example, an HbC adversary in a smart grid application would always use its correct input. The corrupt parties do, however, collude by using information gathered during the execution of the protocol to attempt to violate an honest party's privacy.

Conversely, the malicious adversary model represents the other end of the spectrum in privacy preserving computation. It is assumed that malicious adversaries will deviate from the protocol in any way to attempt to violate another's privacy. As an example, a malicious adversary would use non-random values when a protocol specifies random numbers. Or, all corrupt parties may collaborate when choosing their random values. The malicious adversary model is much stronger model; however, that model comes at a cost, which will be discussed further below.

Another common assumption related to contemporary adversary models is an assumption on the number of corrupt parties in a given protocol execution. Many protocols that use homomorphic encryption are able to achieve full threshold security. In other words, such protocols can guarantee security as long as there is at least one non-corrupt party. In multiparty computation (MPC) protocols, lower thresholds are often seen. For example, for HbC, an assumption that fewer than half of the parties are corrupt is often seen. In the malicious model, an assumption is often that less than a third are corrupt. Other MPC protocols are able to achieve full threshold security but at the expense of requiring computationally expensive operations (e.g., zero-knowledge proofs).

Homomorphic encryption is a special encryption paradigm, which can enable privacy preserving computation. It allows an untrusted party to perform operations on encrypted information (ciphertexts) such that it has a well-defined effect on the unencrypted information (plaintexts). For example, given the encryptions of two values, say $E(x_1)$, $E(x_2)$, an operation may be able to be computed, $E(x_1) \boxplus E(x_2) = E(x_1 + x_2)$, that results in an encrypted sum of the two plaintext values. Note that this requires no knowledge of $x_1$ or $x_2$. Fully homomorphic encryption is a cipher that supports addition and multiplication and allows for the computation of any function.

A primary cipher used with the illustrated embodiments of the invention below is a Paillier cipher, though others ciphers may be used with other embodiments. (Paillier, "Public-key cryptosystems based on composite degree residuosity classes." *Proceedings of the 17$^{th}$ International Conference on Theory and Application of Crypotgraphic Techniques*, EUROCRYPT'99, pp 223-238, Berlin, Heidelberg, 1999). This cipher is additively homomorphic, meaning addition operations may be performed on the plaintext values using only ciphertexts. A brief review using Paillier cipher is illustrated below using a simplified version of the cipher. A public key cipher consists of three routines: "KEYGEN" which generates a public and a private key, "ENC" which returns a ciphertext given the public key and a message, and "DEC" which returns a message given a ciphertext and the private key. The mathematics of each routine is given below:

KEYGEN: Let p, q be large primes of the same size.
Define $n \leftarrow pq, \lambda \leftarrow \phi(n)=(p-1)(q-1)$
Define $g \leftarrow n+1, \mu \rightarrow \lambda^{-1}$ mod n
Encryption (public) key $K_e=(n,g)$,
Decryption (private) key $K_d=(\lambda,\mu)$
ENC: Given—Plaintext m and $K_e=(n,g)$
Choose at random $r \in \mathbb{Z}_n^*$,
Ciphertext $c \leftarrow g^m \cdot r^n$ mod $n^2$
DEC: Given—Ciphertext $c \in \mathbb{Z}_{n^2}^*$, and $K_d=(\lambda,\mu)$
Message $m \leftarrow L(c^\lambda$ mod $n^2) \cdot \mu$ mod n
Where, L(u) returns the quotient of (u−1)/n Multiparty computation (MPC) is a contemporary methodology that addresses problems of having parties $p_1, \ldots, p_n$ with inputs $x_1, \ldots, x_n$ who wish to compute some function of their inputs, say $f(x_1, \ldots, x_n)$, without revealing their individual inputs. The output(s) of the function may be revealed to potentially any group of the parties or even authorized third parties. An overview of MPC is provided below by outlining a generic protocol. Many of the details of this generic MPC protocol are abstracted, as they are not necessary for the purposes describing embodiments of the invention. Furthermore, malicious model MPC protocols are often divided up into two phases, preprocessing and computation. Again, for the purposes of this disclosure, only the computation phase needs to be addressed. For the sake of simplicity, $\mathbb{Z}_p$ is being used as an underlying algebraic structure, though this may vary between embodiments depending on the implementation.

Given a finite field $\mathbb{Z}_p$ for some prime p and each $x_i \in \mathbb{Z}_p$. Each party $p_i$ uses a secret sharing function SHARE: $\mathbb{Z}_p \rightarrow \mathbb{Z}_p^n$ to generate n shares of their input $x_i$. Associated with the SHARE function is a threshold t which determines the number of shares needed to reconstruct the input. Each other party receives one of the shares over a secure channel. Shamir secret sharing will be used for SHARE in this example, but note that other implementations for embodiments of the invention may utilize other linear secret sharing schemes (e.g., additive secret sharing). (Shamir, "How to share a secret." *Communications of the ACM,* 22(11):612-613, 1979). After all inputs are shared among the parties, they then represent a function $f$ as an arithmetic circuit with addition and multiplication gates. They then use functions ADD: $\mathbb{Z}_p + \mathbb{Z}_p \rightarrow \mathbb{Z}_p$ and MULT: $\mathbb{Z}_p \times \mathbb{Z}_p \rightarrow \mathbb{Z}_p$ to evaluate addition and multiplication gates of the arithmetic circuit. For example, say the parties hold shares of a and b (called $a_i$ and $b_i$) and want to compute c=a+b (resp. c=a·b), they each call $c_i$=ADD($a_i$, $b_i$) (resp. $c_i$=MULT($a_i$, $b_i$)) to compute a share $c_i$ of c. It is assumed that embedded within the circuit description are the identities of the parties authorized to learn the output(s) of the function. At the end of the computation of the circuit, the parties send the appropriate shares of the output(s) to the party or parties authorized to learn a given output. The authorized parties then run a function RECOMBINE: $\mathbb{Z}_p^n \rightarrow \mathbb{Z}_p$ which takes n shares of the output value (only t+1 shares are necessary, but in the context of MPC it is often assumed that all n are available) and returns the output value. Many malicious model MPC protocols also include a preprocessing phase where the parties generate helper data to increase security of the computation of SHARE, RECOMBINE, ADD, or MULT. The helper data should not depend on the inputs or the function to be computed (beyond minimal information such as the number of multiplication gates).

Secret share redistribution is an important primitive that may be exploited in protocols utilized in embodiments of the invention that until now have never been applied to secure multiparty computation. A principle of this idea is that a certain number of parties receive shares of a secret. These parties may wish to redistribute their shares to a new (potentially overlapping) set of parties that may have a different reconstruction threshold without reconstructing the original secret. Secret share redistribution protocols aim at solving this problem.

The simplest redistribution protocol is similar to the multiplication protocol already used by MPC. It is secure in the honest-but-curious model and works by having each party share their share with the new parties (i.e., creating subshares). This will work for any linear secret sharing method such as Shamir above or any additive secret sharing.

Figure 1B:
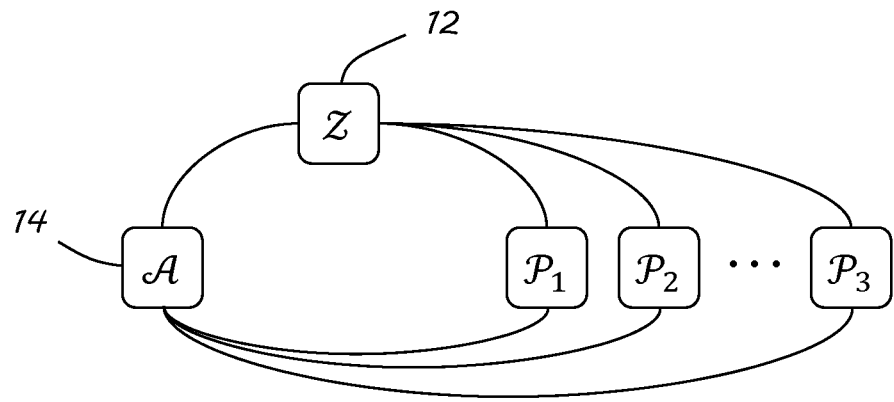
FIG. 1B is a diagram representing the real world in a universally composable security framework setup.

Proving the security of protocols can be a difficult process. One technique that has been used in many areas of cryptography, and in particular in multiparty computation, is the universally composable security (UC) framework. The basic setup of the UC framework begins with two worlds, an ideal world and a real world, and a number of parties $p_1, \ldots, p_n$. In the ideal world, an ideal functionality $\mathcal{F}$ 10 is constructed that is secure by definition (often using a trusted third party). In the real world, a protocol $\pi$ is constructed which realizes the ideal functionality. In each world there is an entity referred to as the environment, denoted $\mathcal{Z}$ 12. In each world, there is an additional party, the adversary $\mathcal{A}$ 14 in the real world and a simulator $\mathcal{S}$ 16 in the ideal world. To keep the setup as generic as possible, $\mathcal{Z}$ 12 is let to provide the inputs to the parties. This setup is shown in FIGS. 1A and 1B. The UC security theorem states that if $\mathcal{Z}$ 12 cannot distinguish between the two worlds, then the protocol $\pi$ run in the real world is secure. The composability theorem states that UC-secure protocols may be composed with each other and themselves in arbitrary (even adversary controlled) ways and still the resulting composition will remain secure. These two theorems are used to prove the security of the protocols construction set out below.

As set out above, MPC allows a static set of parties to compute some function of their inputs without revealing the inputs. Embodiments of the invention improve upon contemporary MPC paradigm by providing an environment able to transfer computations among different groups, creating numerous benefits. The paradigm utilized by embodiments of the invention is referred to as transferable multiparty computation (T-MPC). T-MPC relaxes the restriction of having a static set of parties. While this relaxation might seem simplistic on the surface, constructing T-MPC protocols is non-trivial and the benefits of this relaxation, as will be seen later, are numerous.

For simplicity for illustration purposes, the description of T-MPC is presented as having two sets of parties $P_1$ and $P_2$ (which may or may not overlap and can have different sizes). Let $|P_1|=n'$ and $|P_2|=n$. In the following description it is assumed that one set, $P_2$, is performing a computation and transfers that computation to the other set, $P_1$. These assumptions are made for simplicity only. Embodiments of the invention may contain any number of sets, which may be performing multiparty computations (possibly in parallel) and which may transfer their computation to any other set (or possibly many other sets). Therefore, while the illustrated embodiment of T-MPC has been simplified, the application of T-MPC in other embodiments can vary greatly. In the honest-but-curious case it can be assumed that less than n/2 (n'/2 respectively) parties are corrupt as this is the theoretical maximum for information theoretic MPC protocols. For the malicious case the theoretic maximum is n/3 (n'/3 respectively).

Figure 2:
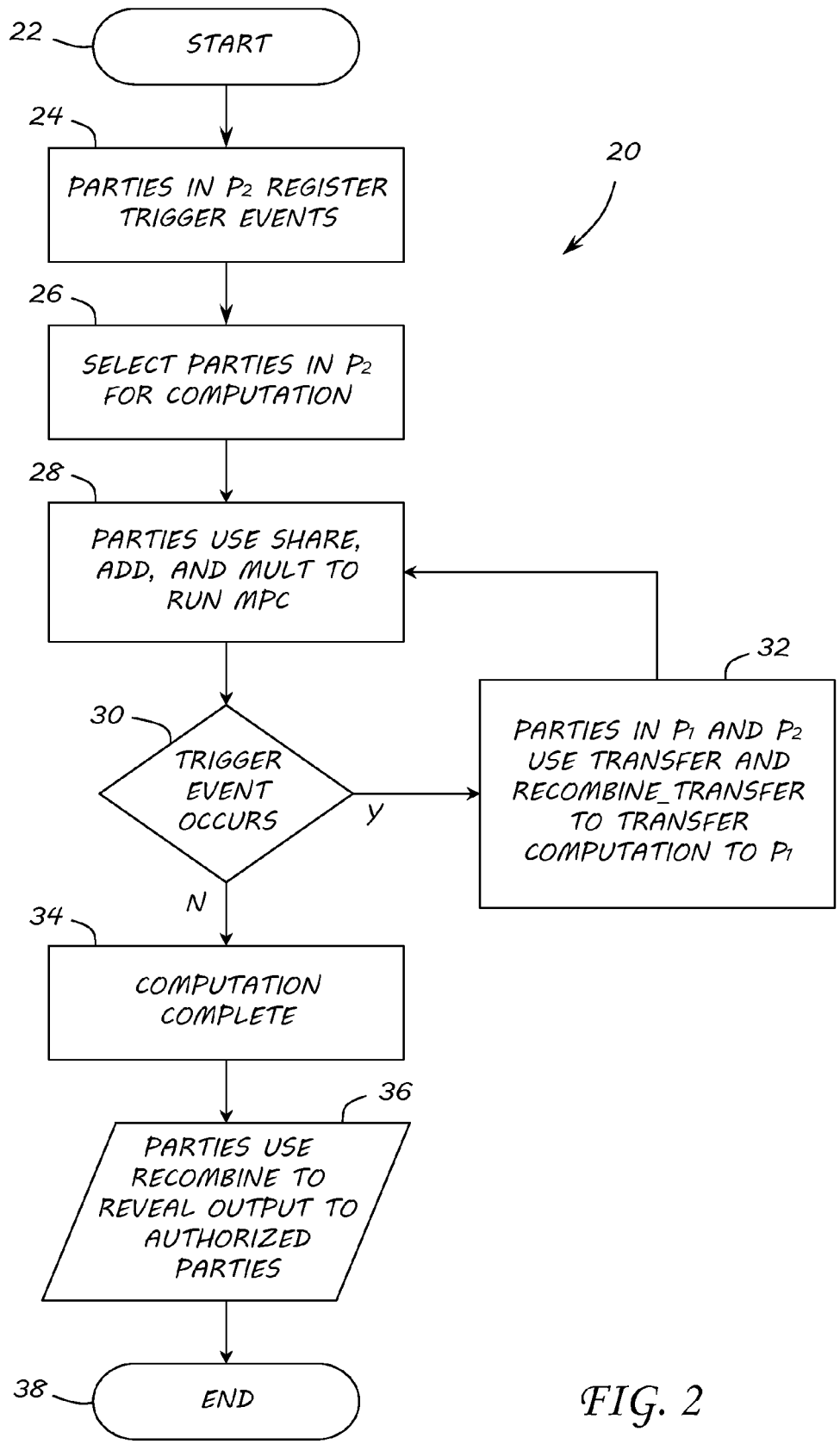
FIG. 2 is a flow diagram of a method of multiparty computation consistent with embodiments of the invention.

T-MPC builds upon the description of MPC set forth above. Therefore, embodiments of the invention have the availability of the functions SHARE, RECOMBINE, ADD, and MULT. Embodiments of the invention add to these functions a signaling mechanism referred to as TRIGGER. This mechanism interrupts an ongoing multiparty computation running among parties of $P_2$ and forces a transfer of the computation to the parties of $P_1$. The TRIGGER mechanism may be configured to run, for example, periodically, upon certain events (e.g., failure of a party), inserted manually into the arithmetic circuit, etc. The TRIGGER mechanism will be explained in more detail in example applications of T-MPC. Two additional functions are defined as, TRANSFER: $\mathbb{Z}_p^n \rightarrow \mathbb{Z}_p^{n'}$ and RECOMBINE_TRANSFER: $\mathbb{Z}_p^{n'} \rightarrow \mathbb{Z}_p$. These two functions exploit a redistribution property of linear secret sharing schemes, which allows an authorized subset of parties holding shares of a secret value, say s, to redistribute s to a new set of parties without revealing s. In particular, for T-MPC, the parties in $P_2$ run TRANSFER to generate subshares for parties in $P_1$ of every value needed for $P_1$ to continue the multiparty computation. Parties in $P_1$ then use RECOMBINE_TRANSFER to compute new shares of these values. Using all of the functions specified, a flow diagram 20 of T-MPC is shown in FIG. 2.

The process begins at block 22. Parties in $P_2$ register trigger events in block 24. As set out above, the trigger events may include a failure of a party in $P_2$. Parties in $P_2$ are then selected for a computation in block 26. These selected parties use the MPC functions SHARE, ADD, and MULT to perform the computations in block 28. If a trigger event occurs ("Yes" branch of decision block 30), then the parties in $P_1$ and $P_2$ use the new TRANSFER and RECOMBINE_TRANSFER functions available in embodiments of the invention to transfer computation from the parties in $P_2$ to parties in $P_1$ in block 32. The parties in $P_1$ then use the MPC functions SHARE, ADD, and MULT to perform the computations in block 28. Otherwise ("No" branch of decision block 30), the computation is completed in block 34. Authorized parties then use RECOMBINE to reveal the output to those parties in block 38. The process ends at block 38.

Methods due to Ben-Or et al., "Completeness theorems for non-cryptographic fault-tolerant distributed computations," *Proceedings of the Twentieth Annual ACM Symposium on Theory of Computing*, STOC '88, pp 1-10, ACM, 1988, are used for the basic functions of MPC (i.e., SHARE, RECOMBINE, ADD and MULT) in the illustrated embodiment. SHARE and RECOMBINE are both handled using Shamir secret sharing set out above. Briefly, to generate shares $s_i$ of s such that any subgroup of t+1 out of the n parties can reconstruct s, a polynomial $\sigma(x)=s+r_1x+r_2x^2+\ldots+r_tx^t$ is constructed in a finite field where the coefficients $r_j$ are chosen randomly from the field. $s(i)=\sigma(i)$ is then sent party i. Any subgroup of at least t+1 parties can reconstruct s by exchanging their shares with one another and using Lagrangian interpolation to compute $\sigma(0)=s$. To compute ADD on two secret inputs, say s and s', each party simply adds their shares of the inputs. No communication is required at all. To compute MULT on two secret inputs s and s', each party $p_i$ computes $m_i'=s_i \cdot s_i'$ then uses Shamir secret sharing to create subshares of $m_i'$, and distributes a subshare to each of the other parties. Party $p_i$ then uses Lagrangian interpolation on the subshares they receive from the other parties to compute $m_i$, which turns out to be a valid sharing of $m=s \cdot s'$. These functions are combined together into a single honest-but-curious MPC protocol $\pi_{mpc_h}$.

The new functions, TRANSFER and RECOMBINE_TRANSFER, form the honest-but-curious transfer protocol $\pi_{T_h}$. Assume that upon a TRIGGER event, parties in $P_2$ must transfer an input value s to parties in $P_1$. The redistribution function needed for TRANSFER and RECOMBINE_TRANSFER works similar to the multiplication protocol set out above. As illustrated in flowchart 40 in FIG. 3, each party $p_j \in P_2$ with share $s_j$ of s, computes n' subshares of $s_j$ using Shamir secret sharing with threshold t' (block 44) and sends subshare $s_{ji}$ to party $p_i \in P_1$ (block 46). As seen in flowchart 50 in FIG. 4, party $p_i$, after collecting all subshares (block 54), computes RECOMBINE_TRANSFER by running Lagrangian interpolation on the subshares to compute the new share $s_i$ of s (block 56). This process is set out in further detail below:

Given: $P_1, P_2 \subseteq P$ where each $p_j \in P_2$ holds a share $s_j$ of s, and $|P_1|=n'$, $|P_2|=n$ and $t'=I(n'/2)$ and $t=I(n/2)$ (where I is an integer larger than the parameter).

TRANSFER: Upon a trigger event
  1. Each $p_j$ generates subshares $s_{1j}, \ldots, s_{n'j}$ of $s_j$ using Shamir secret sharing with a threshold of t' and a random polynomial with coefficients $(s_j, r_{j1}, r_{j2}, \ldots, r_{jt'-1})$. (block 44)
  2. Each $p_j$ sends the subshare $s_{ij}$ to party $p_i \in P_1$ over a private channel. (block 46)

RECOMBINE_TRANSFER
  1. Each $p_i \in P_1$ receives n subshares $s_{ij}$. (block 54)
  2. $p_i$ then uses Lagrangian Interpolation to recover their new share $s_i$. (block 56)

Since all parties can generate and recombine shares in parallel, these methods are quite efficient. Straightforward algorithms for generating the shares (polynomial evaluation) and recombining (Lagrange interpolation) are quadratic, but there exist $O(n \log^2 n)$ algorithms for each. Even the quadratic algorithms would be sufficiently fast for most applications. As the $n_j$ parties must communicate each of their $n_i$ shares, the communication complexity is $O(n_j n_i)$ (assuming only one communication channel). Since only the threshold t needs to be satisfied, the computation and communication requirements may be made even more efficient in practice.

The security and correctness of SHARE, RECOMBINE, ADD and MULT as used in MPC were set forth above. Using the universally composable (UC) framework, also set out above, therefore greatly simplifies proving the security of T-MPC HbC realization. Security of the transfer protocol $\pi_{T_h}$ may be proven in the framework by giving an ideal functionality $\mathcal{F}_{T_h}$ as illustrated below:

1. All parties in $P_2$ send their shares, $s_j$, to $\mathcal{F}_{T_h}$.
2. $\mathcal{F}_{T_h}$ uses the share to reconstruct s and then generates new shares, $s_i$ of s for the parties $P_1$.
3. For each corrupt party $p_i \epsilon P_2$, $\mathcal{F}_{T_h}$ sends $s_j$ to $\mathcal{S}_{T_h}$ and for each corrupt party $p_i \epsilon P_1$, it sends $s_i$ to a simulator.
4. $\mathcal{F}_{T_h}$ sends the share $s_i$ to $p_i \epsilon P_1$.

The simulator $\mathcal{S}_{T_h}$ receives the shares $s_j$ and $s_i$ of corrupt parties from $\mathcal{F}_{T_h}$. For each $s_j$, the simulator generates subshares as specified in the protocol. For each $s_i$, exactly one subshare of $s_j$ would be used in the reconstruction of $s_i$, so the simulator uses these subshares along with enough random values to interpolate a proper polynomial sharing of $s_i$. This polynomial is then used to compute the subshares of $s_i$. Finally the simulator leaks all shares and subshares it knows to $\mathcal{Z}$.

$\mathcal{F}_{T_h}$ is secure by definition (it is basically a trusted third party) and the information it leaks to $\mathcal{S}_{T_h}$ does not violate any party's privacy as thresholds are not met by the corrupt parties. Since the simulated subshares that $\mathcal{S}_{T_h}$ leaks are uniformly random, the two worlds are indistinguishable. Therefore, the protocol $\pi_{T_h}$ is as secure as $\mathcal{F}_{T_h}$.

In another illustrated embodiment, and building upon the T-MPC realization set forth above, a malicious model variant is provided. Since security is proven in the UC framework, the protocol is divided into subprotocols. Like in the HbC case above, T-MPC is broken into an MPC protocol, $\pi_{mpc}$, built with SHARE, RECOMBINE, ADD, and MULT and a transfer protocol, $\pi_{T_m}$, built with TRANSFER and RECOMBINE_TRANSFER. Therefore, we can use an already existing, UC-secure, malicious model MPC protocol may be used. Therefore, discussion below will focus on TRANSFER and RECOMBINE_TRANSFER and construct a single protocol $\pi_{T_m}$ from these two functions.

As seen in flowcharts 60 and 70 in FIGS. 5 and 6, respectively, the illustrated embodiment with the malicious model transfer protocol works as follows. For TRANSFER, each party in $P_2$ shares their share of s with the parties in $P_1$. For RECOMBINE_TRANSFER an assumption is made that less than a third of the parties are corrupt. Thus, Shamir secret sharing reconstruction can be made robust using Reed-Solomon decoding. However, under normal circumstances robustness is generally not enough for malicious model MPC as it assumes that the dealer is honest. But, in the illustrated case, the shares that a party in $P_1$ receives come from each party in $P_2$. Therefore, there is no one single dealer. Since there are enough honest parties in $P_2$, each $p_i \epsilon P_1$ receives enough honest shares to be guaranteed to recover the correct new share. This protocol is illustrated below:

Given: $P_1$, $P_2 \subseteq P$ where each $p_j \epsilon P_2$ holds a share $s_j$ of s, and $|P_1|=n'$, $|P_2|=n$ and $t'=I(n'/2)$ and $t=I(n/2)^1$ respectively (where I is an integer just larger than the parameter).

TRANSFER: Upon a trigger event
1. Each $p_j$ generates subshares $s_{1j}, \ldots, s_{nj}$ of $s_j$ using Shamir secret sharing with a random polynomial with coefficients $(s_j, r_{j1}, r_{j2}, \ldots, r_{jt'-1})$. (block 64)
2. Each $p_j$ sends the subshare $s_{ij}$ to party $p_i \epsilon P_1$ over a private channel. (block 66)

RECOMBINE_TRANSFER:
1. Each $p_i \epsilon P_1$ receives n subshares $s_{ij}$. (block 74)
2. $p_i$ uses a Reed-Solomon decoder on the subshares to recover $s_i$. (block 76)

For a small number of parties, a simple brute force RS decoder is faster than more sophisticated decoders. For this decoder, each subgroup of shares of size t are taken and run through a regular Lagrangian interpolation algorithm. Each of these values could be the correct decoding. To determine the output, simple majority rules are used. Given the number of assumed corrupt parties and the threshold used for sharing, this protocol will be corrected with overwhelming probability.

The malicious transfer function is very similar to the honest-but-curious function and, therefore, has the similar complexity. TRANSFER is the same. The difference is with RECOMBINE_TRANSFER. Instead of running Lagrangian interpolation, a robust reconstruction is performed. Though, as noted above, a simple brute force RS decoder is quite fast for small numbers of parties even though the asymptotic complexity is poor (on the order of n!). Communication complexity is quadratic like in the honest-but-curious case.

UC framework, as set forth above, may also be used to prove the security of the malicious model realization of T-MPC. The UC framework provides existing MPC protocols which are secure in the malicious model for SHARE, RECOMBINE, ADD, and MULT. Thus, as with the HbC model above, the security proof focuses on the functions TRANSFER and RECOMBINE_TRANSFER of $\pi_{T_m}$.

As set out above, a goal in utilizing UC framework is to make it so that the environment $\mathcal{Z}$ 12 cannot distinguish between the real world executing $\pi_{T_m}$ against an adversary $\mathcal{A}$ 14 and the ideal world executing an ideal functionality $\mathcal{F}_T$ 10. To accomplish this a simulator $\mathcal{S}_{T_m}$ 16 is specified which sits between $\mathcal{F}_{T_m}$ 10 and $\mathcal{Z}$ 12 and whose goal is to simulate $\pi_{T_m}$ in such a way that $\mathcal{Z}$ 12 cannot make the distinction. To keep the setup as generic as possible $\mathcal{Z}$ 12 is allowed to provide inputs to the parties (i.e., their shares of s). Ideal functionality $\mathcal{F}_{T_m}$ 10 and the interaction with $\mathcal{S}_{T_m}$ 16 is illustrated below:

1. Honest parties in $P_2$ send their shares, $s_j$, to $\mathcal{F}_{T_m}$.
2. $\mathcal{F}_{T_m}$ uses these share to generate the shares of corrupt parties in $P_2$ and sends them to $\mathcal{S}_{T_m}$. This is possible since it is assumed that less than a third of the parties are corrupt.
3. $\mathcal{F}_{T_m}$ also creates subshares of each of the honest shares received in step 1 and sends any of those that would be delivered to corrupt parties in $P_1$ to $\mathcal{S}_{T_m}$.
4. $\mathcal{F}_{T_m}$ receives subshares for the corrupt parties from $\mathcal{S}_{T_m}$. $\mathcal{F}_{T_m}$ then verifies that these subshares are valid (i.e., come from a correct degree polynomial with $s_j$ as the constant term).
5. $\mathcal{F}_{T_m}$ uses the valid subshares to generate the new shares $s_i$ and sends $s_i$ to $p_i \epsilon P_1$. It also sends $s_i$ to $\mathcal{S}_{T_m}$ for each corrupt $p_i$.

Simulator $\mathcal{S}_{T_m}$ 16 receives the shares $s_j$ and subshares as set out above in steps 2 and 3. $\mathcal{S}_{T_m}$ 16 invokes a copy of $\mathcal{A}$ 14 with the shares and subshares as input. $\mathcal{A}$ 14 gives back to $\mathcal{S}_{T_m}$ 16 values that represent the (possibly corrupted) subsharings of the corrupt parties. $\mathcal{S}_{T_m}$ returns these to $\mathcal{F}_{T_m}$ 10. $\mathcal{S}_{T_m}$ 16 then waits for the shares $s_i$ in step 5 and finally $\mathcal{S}_{T_m}$ 16 sends all of its information to $\mathcal{Z}$ 12.

$\mathcal{F}_{T_m}$ 10, as with HbC above, is secure by definition (it is basically a trusted third party) and the information it leaks to $\mathcal{S}_{T_m}$ 16 does not violate anyone's privacy. Since the simulated subshares that $\mathcal{S}_{T_m}$ 16 leaks are uniformly random or were chosen by the invoked copy of $\mathcal{A}$ 14, the two worlds are indistinguishable. Therefore, the protocol $\pi_{T_m}$ is as secure as $\mathcal{F}_{T_m}$ 10.

The T-MPC protocols set out above may now be applied, in an illustrative example, to perform privacy preserving computations in a smart grid. The smart grid exploits fine granularity of information reporting to better optimize various operations like generation, routing, purchasing, forecasting, etc. of certain utilities such as electricity, water and gas. In a smart grid, there are many actors in play, including the consumers, the meter device manufacturer, the smart grid operator, the utility producers (e.g., electricity generation companies), the utility distributor (usually the local utility company), and as well as others. Any one of these players could gain a competitive advantage by utilizing the fine-grained information reporting beyond what a consumer would desire. Furthermore, any one of these players could potentially be vulnerable to a data breach, which results in sensitive information being leaked to unintended parties. For this illustrative example, an assumption is made that, at the very least, the device manufacturer is separate from the other players and is trustworthy enough to honestly implement the protocols for privacy preserving data aggregation.

There are significant privacy concerns about the fine-grained information reporting that takes place in contemporary smart grid setups. One approach to solving this problem is to continue to have meters report all the fine-grained information to all the authorized players and require those players to individually secure the information. Another approach is to follow the principle of least privilege and only give the end nodes exactly what they need, which is typically only a function of the fine-grained information. The latter approach is more desirable from an information security prospective.

MPC is be explored for application to the smart grid and has been shown to potentially be more efficient at computing sums than some specialized protocols as it avoids expensive public key operations. MPC has another benefit in that it could be used to compute not just the sum function, but more advanced functions, such as the standard deviation. Thus, MPC in general, and as shown below, T-MPC in particular, provides a capability to the smart grid that prior protocols have been unable to achieve, increasing efficiency and scalability.

T-MPC protocols are compared with standard MPC protocols below to illustrate the efficiency of T-MPC for performing in-network computations for the smart grid. The comparison is focused on the computation of the sum and the standard deviation of meter readings at one instance in time. These two functions were selected as they represent two ends of the spectrum for privacy preserving computations in the smart grid. Sum has no multiplications where standard deviation has many. Multiplication is typically the most expensive operation in MPC protocols. The input of each meter is their instantaneous power consumption.

Figure 7:
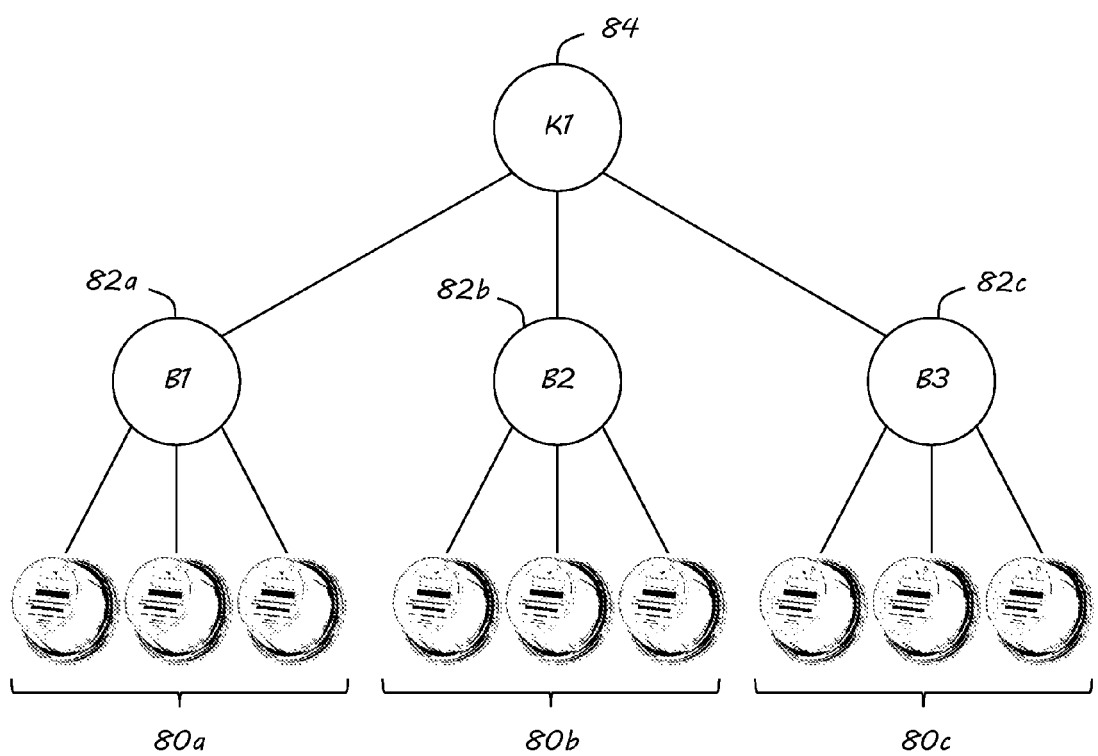
FIG. 7 is a diagram representing a tree structured network, such as for a smart grid.

In applying T-MPC to a smart grid, a network organization similar to that of FIG. 7 will be used for this example. Various branching factors and various numbers of nodes will be considered. Assume that nodes 80*a-c* can communicate directly with their sibling nodes 80*a-c*, their parent node 82*a-c*, and their parent's siblings 82*a-c*. Also assume that the root node of the tree 84 can communicate with any other node in the tree (this can be achieved directly or through routing). Finally, to simplify the analysis, also assume that each level in the tree is complete.

The implementation used for the experiments comes from the VIFF (http://viff.dk) framework which runs on Python. For the meter nodes, a Gumstix Overo Earth with a 600 MHz processor and 256 MB of RAM is used. While this is more powerful than some contemporary smart meters, similar performance is expected to be achieved in future smart meters, possibly by using custom chips. The final result of the computation will be reconstructed by the root of the tree. For this node a laptop running an Intel Core i5-540M cpu and 4 GB of RAM was used. For communications, assume a halfduplex, 250 kbps wireless link with a single communications channel.

To assist in the analysis, the operations necessary for MPC have been timed on both the Gumstix and the laptop. As ADD is a constant time operation, the average time to add two shares in VIFF was measured. The other three operations (SHARE, RECONSTRUCT and MULTIPLY) are linear in the number of parties, thus the coefficients of the line were estimated by running computations with various numbers of parties and run linear regression analysis. The table in FIG. 8 shows values computed for the HbC operations. For the linear operations, the coefficients of a line y=c2x+c1 were given, which estimated the time to compute each operation for a given number of parties. The table in FIG. 9 shows updated measurements for multiply in the malicious model as well as an estimated polynomial y=c3x2+c2x+c1 to compute the time to run the preprocessing phase. The output in all cases is in milliseconds. The other operations in the malicious model take the same time as in the HbC model. As currently implemented, VIFF does not do robust reconstruction in the malicious model, which is why reconstruct is the same in both models.

To get timing information for the transfer protocols, the measurements above are used. In the HbC model, the transfer protocol consists of a number of calls to SHARE and RECONSTRUCT. In the malicious model, again calls to SHARE can be used. For RECONSTRUCT, however, recall that it was decided in the illustrated embodiment above to use a brute-force Reed-Solomon decoder. This calls RECONSTRUCT a number of times and uses a simple majority-rules heuristic to decide on the output, thus the timing information for reconstruct can be used multiplied by the number of times it would have to be called for proper robust reconstruction to build our timing estimate for the malicious model transfer function.

Using the timing values from the tables in FIGS. 8 and 9, the total time to execute two functions of interest, summation and standard deviation. To avoid division and square roots in the computation of the standard deviation $$\left( \sqrt{\frac{1}{n} \sum_{i=1}^{n} (x_i - \mu)^2} \right),$$

just the numerator is returned (it is assumed that the root of the tree knows n). Note that this leaks no additional information when compared to computing the standard deviation in its entirety.

Figure 10:
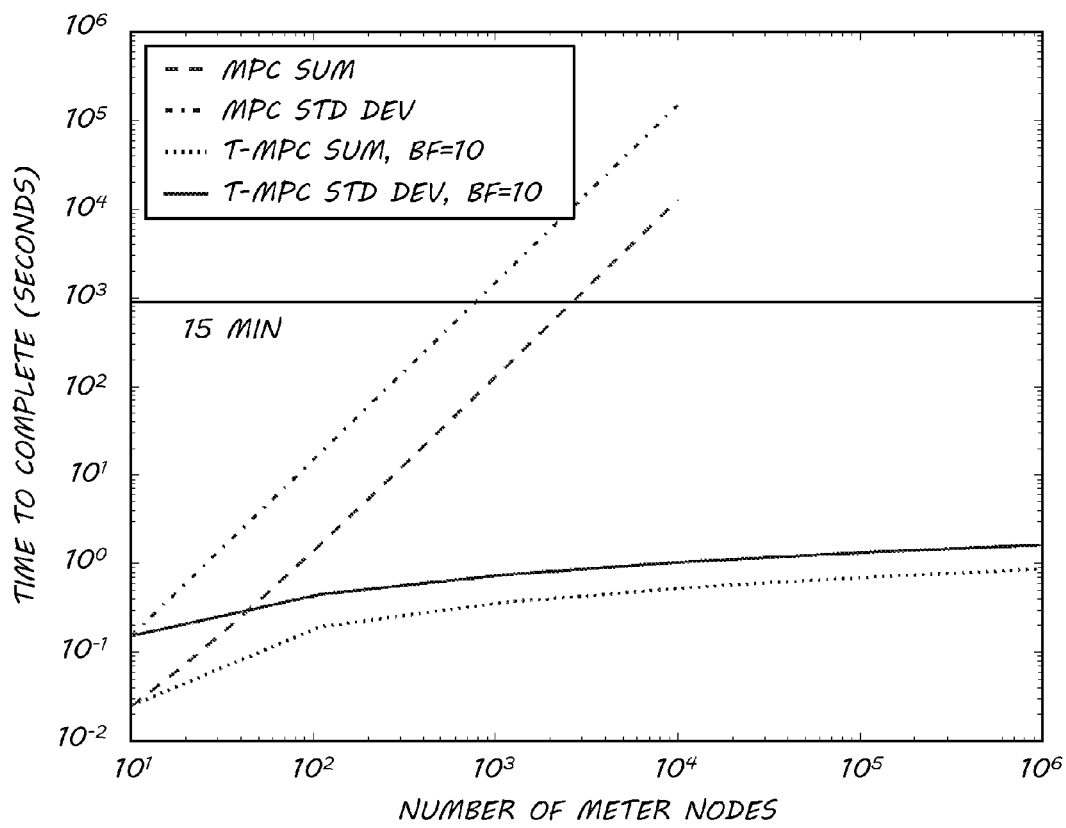
FIG. 10 is a graph of HbC Multiparty Computation vs. Transferrable-Multiparty Computation with a network tree branching factor of 10.
Figure 11:
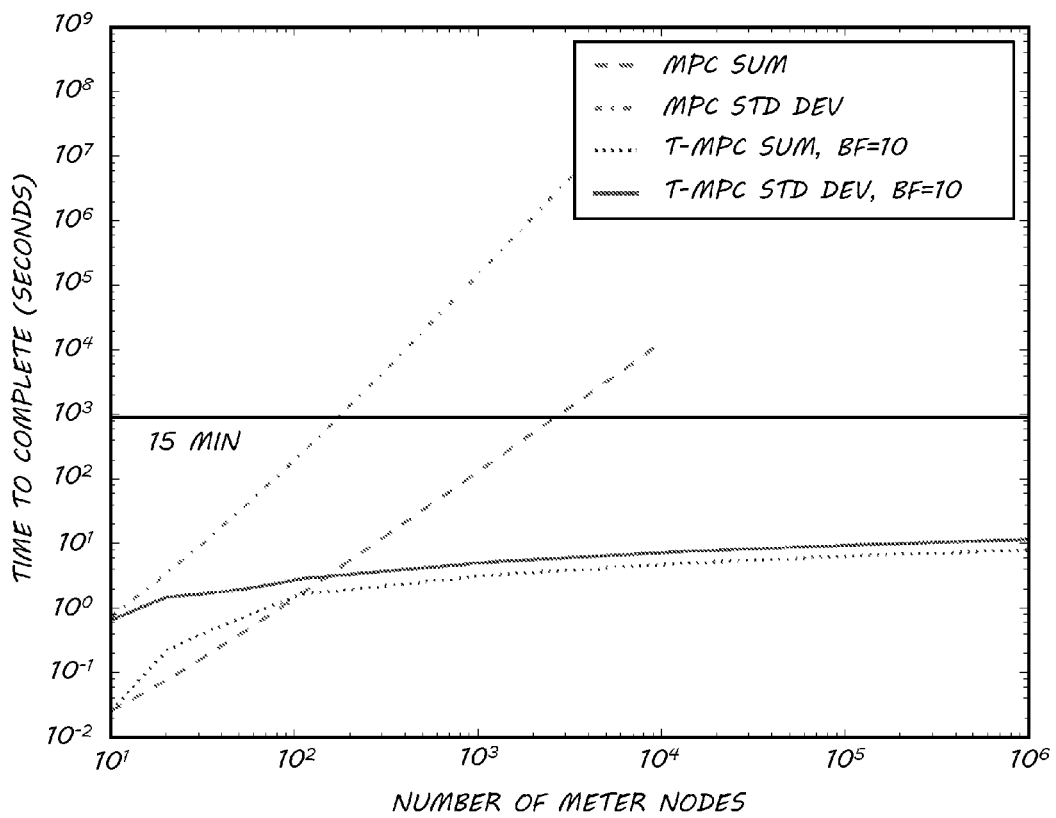
FIG. 11 is a graph of Malicious model Multiparty Computation vs. Transferrable-Multiparty Computation with a network tree branching factor of 10.

Turning first to the comparison of MPC and T-MPC. T-MPC allows for parallelizing in-grid computations using the tree structure set out above. This results in a significant optimization of both the sum and standard deviation. The network tree branching factor is fixed (i.e., the number of children that each node has) to 10 and the time to execute each computation is plotted. The results for the honest-but-curious model are shown in FIG. 10. FIG. 11 shows the results of the experiment repeated using the malicious model protocols.

The benefit of T-MPC is clear. In FIG. 10 it can be seen that in the HbC model, using the MPC protocol, the sum and standard deviations can be computed in less than fifteen minutes as long as there are fewer than 2647 and 777 meter nodes respectively. Compare this with T-MPC, however, where even at $10^6$ meter nodes, the time is still well under the fifteen minute mark. In fact, the protocol execution time with this large of a network takes less than 2 seconds for both the sum and the standard deviation. In the malicious model, shown in FIG. 11, it can be seen that MPC supports networks of around 2000 and just under 200 for sum and standard deviation respectively. Whereas with T-MPC, again, orders of magnitude larger networks can be supported. This illustrates how T-MPC greatly enhances the scalability of the network in the smart metering example. Furthermore, this increased scalability allows for more fine grained information reporting in reasonably sized networks. This is significant as prior, specialized summation protocols which use homomorphic encryption can only support networks of up to 50 nodes at an information reporting granularity of 60 seconds.

Figure 12:
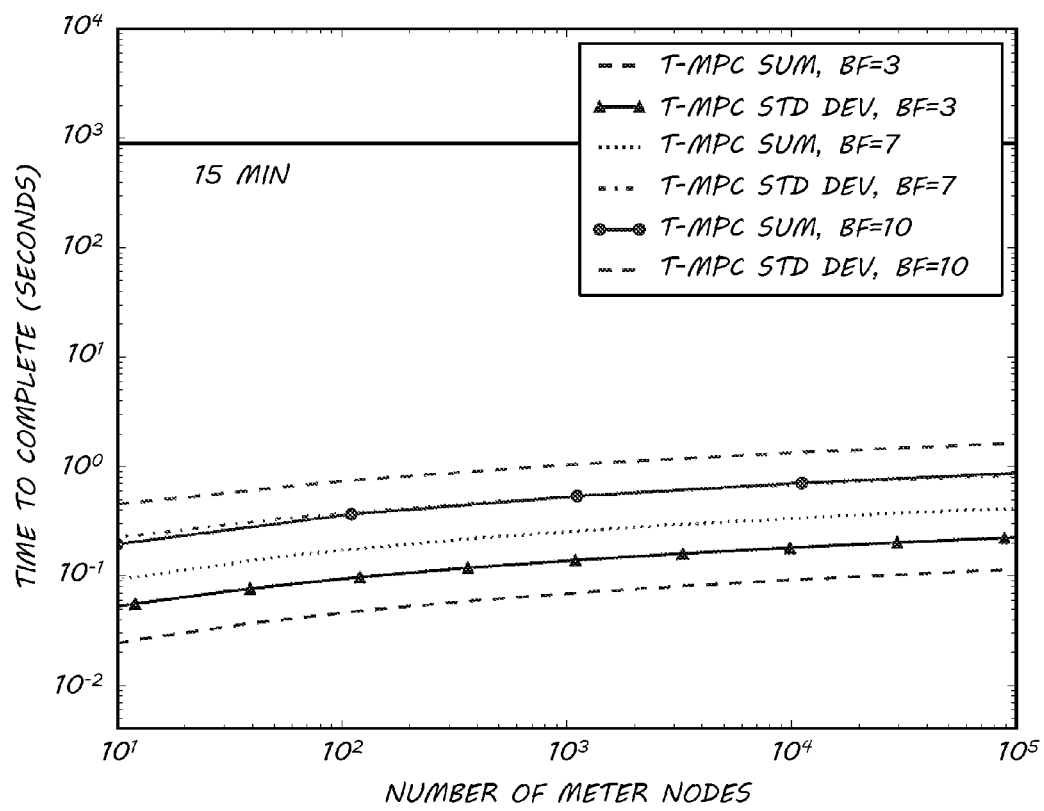
FIG. 12 is a graph of various branching factors for HbC Transferrable-Multiparty Computation.
Figure 13:
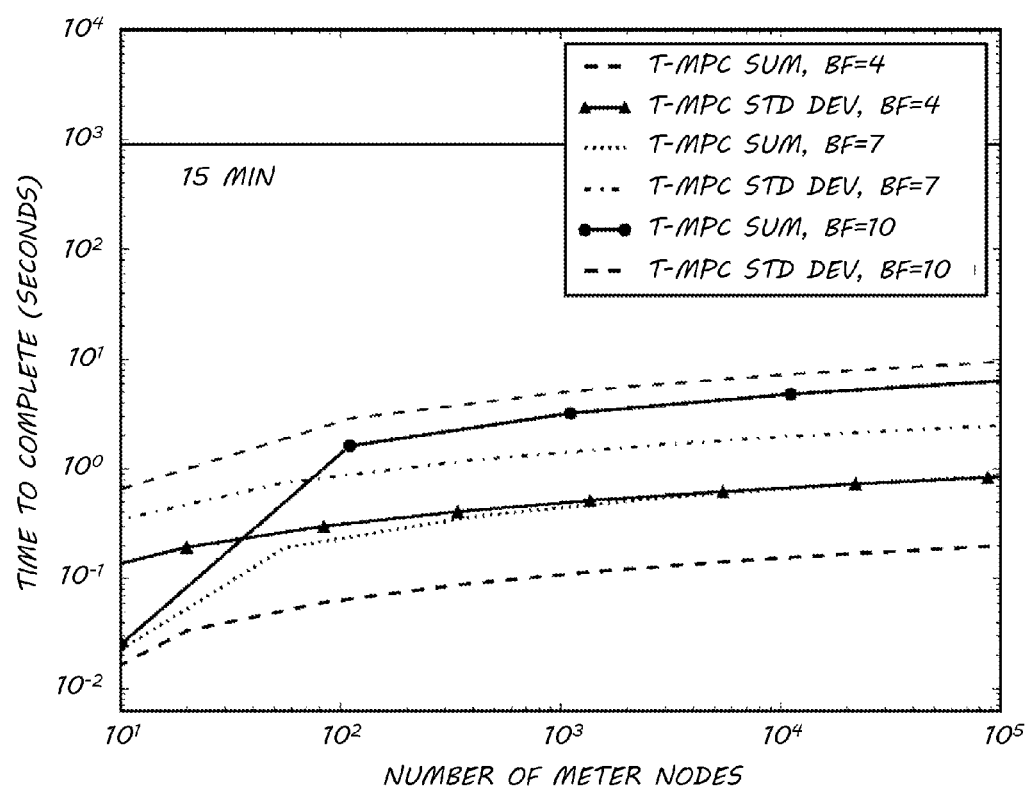
FIG. 13 is a graph of various branching factors for Malicious model Transferable-Multiparty Computation.

In the comparison between MPC and T-MPC, a branching factor of 10 was used in the construction of the tree. The branching factor determines a number of things including how many shares are used when secret sharing inputs, the depth of the tree, amount of parallelism, etc. In FIGS. 12 and 13 the time to execute T-MPC for both sum and standard deviation is plotted with various branching factors using the HbC protocol and the malicious model protocol respectively. From the figures it can be see that branching factor does play some role into the efficiency of the protocol. Here it can be seen that branching factor is important, but asymptotically, the differences are fairly minor. As the branching factor approaches n (the total number of meter nodes), however, T-MPC in this case becomes equivalent to the underlying MPC protocol. There is another underlying aspect to the branching factor. An assumption has been made that for a subset of parties $P_i$ of size $n_i$ that there are $t_i < n_i/2$ adversary controlled parties due to the underlying MPC protocol. In the case of a tree structured network $n_i$=BF. Therefore, in the HbC model, for BF=3 (BF=4 in the malicious model) there can only be one corrupted party in each subset but for BF=11 the HbC T-MPC protocol (BF=16 for malicious model) could handle up to five corrupted parties. Understanding the implications of this is especially important in real world deployments.

Embodiments of the invention may be implemented on numerous hardware platforms. FIG. 12 illustrates an exemplary hardware and software environment for an apparatus 90 suitable for performing transferrable multiparty computation consistent with the invention. Apparatus 90 may act as parent nodes 82a-c or the root node 84 in FIG. 7, or apparatus may also act as any nodes 80a-c. For the purposes of embodiments of the invention, apparatus 90 may represent practically any computer, computer system, or programmable device, e.g., multi-user or single-user computers, desktop computers, portable computers and devices, hand-held devices, network devices, mobile phones, etc. Apparatus 90 will hereinafter be referred to as a "computer" although it should be appreciated that the term "apparatus" may also include other suitable programmable electronic devices.

Computer 90 typically includes at least one processor 92 coupled to a memory 94. Processor 92 may represent one or more processors (e.g. microprocessors), and memory 94 may represent the random access memory (RAM) devices comprising the main storage of computer 90, as well as any supplemental levels of memory, e.g., cache memories, non-volatile or backup memories (e.g. programmable or flash memories), read-only memories, etc. In addition, memory 94 may be considered to include memory storage physically located elsewhere in computer 90, e.g., any cache memory in a processor 92, as well as any storage capacity used as a virtual memory, e.g., as stored on a mass storage device 96 or another computer coupled to computer 98 via a network 100, which may include both a wired and wireless network. The mass storage device 96 may contain a cache or other data, such as the models used to identify and classify segments of the binary firmware image as well as temporary or permanent storage of the firmware image itself.

Computer 90 also typically receives a number of inputs and outputs for communicating information externally. For interface with a user or operator, computer 90 typically includes one or more user input devices 102 (e.g., a keyboard, a mouse, a trackball, a joystick, a touchpad, a keypad, a stylus, and/or a microphone, among others). Computer 90 may also include a display 104 (e.g., a CRT monitor, an LCD display panel, and/or a speaker, among others). The interface to computer 90 may also be through an external terminal connected directly or remotely to computer 90, or through another computer 98 communicating with computer 90 via a network 100, modem, or other type of communications device. Computer 98 may act as parent nodes 82a-c or the root node 84 in FIG. 7. Or, computer 98 may be another computer authorized to receive final computations. Additionally, computer 90 may receive computation shares through the network 100 from a node 80 as set forth above.

Computer 90 operates under the control of an operating system 106, and executes or otherwise relies upon various computer software applications, components, programs, objects, modules, data structures, etc. (e.g. transferrable multiparty computation 108 having modules including SHARE, ADD, MULT, RECOMBINE, TRIGGER, TRANSFER, RECOMBINE_TRANSFER, etc.). Computer 90 communicates on the network 100 through a network interface 110.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to non-transitory physical, recordable type media such as volatile and non-volatile memory devices, floppy and other removable disks, hard disk drives, optical disks (e.g., CD-ROM's, DVD's, etc.), among others; and transmission type media such as digital and analog communication links.

In addition, various program code described may be identified based upon the application or software component within which it is implemented in specific embodiments of the invention. However, it should be appreciated that any particular program nomenclature used is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Figure 14:
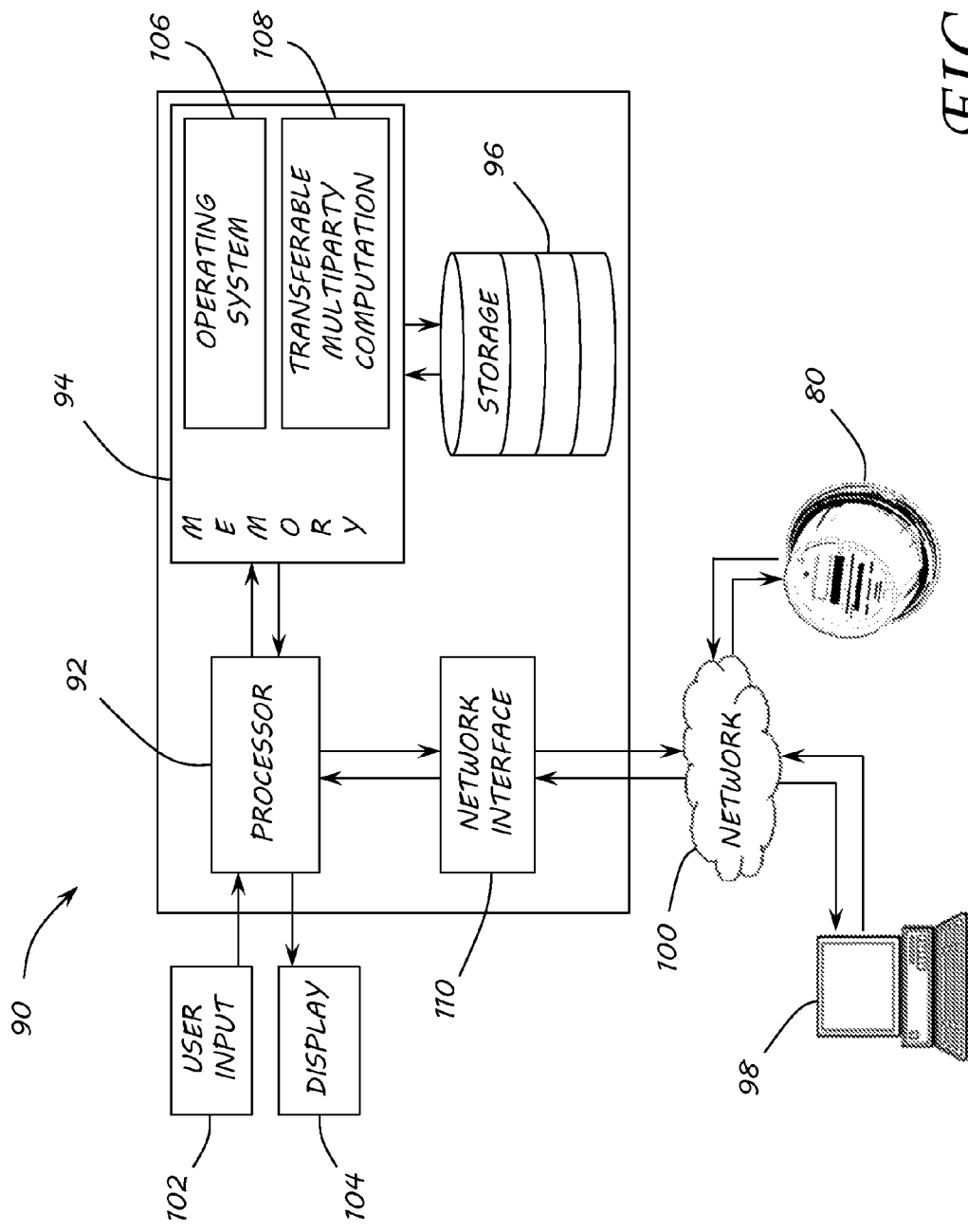
FIG. 14 is a diagrammatic illustration of an exemplary hardware and software environment suitable for performing Transferable-Multiparty Computation consistent with embodiments of the invention.

Those skilled in the art will recognize that the exemplary environment illustrated in FIG. 14 is not intended to limit the present invention. Indeed, those skilled in the art will recognize that other alternative hardware and/or software environments may be used without departing from the scope of the invention.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of secure multiparty computation, the method comprising:
    selecting a set of first parties from a plurality of first parties for computation;
    dividing inputs for the computation associated with each party in the set of first parties into shares to be sent to other parties in the set of first parties;
    performing the computation on the shares by the set of first parties using multiparty computation functions selected from a group consisting of: SHARE, ADD, MULT, RECOMBINE, and combinations thereof;
    in response to a trigger event, interrupting the computation on the set of first parties and transferring shares of the set of first parties to a set of second parties selected from a plurality of second parties;
    completing the computation by the set of second parties using the transferred shares; and
    recombining the transferred shares to reveal an output of the computation.

2. The method of claim 1, wherein transferring shares comprises:
    generating subshares of a share that is being transferred;
    sending one subshare of the generated subshares to each party in the set of second parties; and
    performing a Lagrangian interpolation on subshares received by each of the parties in the second set of parties to generate a share for computation.

3. The method of claim 1, wherein transferring shares comprises:
    generating subshares of a share that is being transferred;
    sending one subshare of the generated subshares to each party in the set of second parties; and
    performing a Reed-Solomon decoder for robust reconstruction on subshares received by each of the parties in the second set of parties to generate a share for computation.

4. The method of claim 1, wherein the trigger event includes a failure of a party.

5. The method of claim 1, wherein a trigger event is generated periodically.

6. The method of claim 1, wherein parties in the first plurality of parties overlap with parties in the second plurality of parties.

7. The method of claim 6, wherein parties in the set of first parties overlap with parties in the set of second parties.

8. The method of claim 1, wherein the trigger event is a first trigger event, the method further comprising:
    in response to a second trigger event, transferring shares of the set of second parties to a set of third parties selected from a plurality of third parties;
    completing the computation by the set of third parties using the transferred shares; and
    recombining the transferred shares to reveal an output of the computation.

9. A system comprising:
    a first node including:
        a first processor;
        a first memory;
        a first network interface;
        first program code resident in the first memory and configured to be executed by the first processor, the first program code configured to perform secure multiparty computation, the first program code further configured to receive shares for computation via the network interface and perform the computation on the received shares using multiparty computation functions selected from a group consisting of: SHARE, ADD, MULT, RECOMBINE, and combinations thereof; and
        in response to a trigger event, the first program code further configured to interrupt the computation and transfer a share of the received shares by:
            generating sub shares of a share that is being transferred;
            sending at least one subshare of the generated subshares to a second node.

10. The system of claim 9, further comprising:
    the second node including:
        a second processor;
        a second memory;
        a second network interface; and
        second program code resident in the second memory and configured to be executed by the second processor, the second program code configured to perform secure multiparty computation, the second program code further configured to receive transferred subshares for computation via the network interface, perform a Lagrangian interpolation on the received transferred subshares to generate a share for computation, and perform the computation on interpolated shares using multiparty computation functions selected from a group consisting of: SHARE, ADD, MULT, RECOMBINE, and combinations thereof.

11. The system of claim 9, further comprising:
    the second node including:
        a second processor;
        a second memory;
        a second network interface; and
        second program code resident in the second memory and configured to be executed by the second processor, the second program code configured to perform secure multiparty computation, the second program code further configured to receive transferred subshares for computation via the network interface, perform a Reed-Solomon decoder for robust reconstruction on the received transferred subshares to generate a share for computation, and perform the computation on decoded shares using multiparty computation functions selected from a group consisting of: SHARE, ADD, MULT, RECOMBINE, and combinations thereof.

* * * * *